Oct. 25, 1955     I. MAKRAUER     2,721,691
BAGS WITH MULTIPLY WALLS AND METHOD OF MANUFACTURE
Filed Sept. 17, 1953

INVENTOR.
Irvin Makrauer.
BY
DES JARDINS, ROBINSON & KEISER
Albert F. Robinson
HIS ATTORNEYS.

United States Patent Office 2,721,691
Patented Oct. 25, 1955

2,721,691

BAGS WITH MULTIPLY WALLS AND METHOD OF MANUFACTURE

Irvin Makrauer, Cincinnati, Ohio, assignor to Sydney-Thomas Corporation, Cincinnati, Ohio, a corporation of Ohio Application September 17, 1953, Serial No. 380,843

11 Claims. (Cl. 229—55)

This invention relates to drum liners having walls formed from a multiple of tubular plies which are joined at their opposite ends to seal said plies together, leaving the intermediate portions between the ends separated or disconnected to provide a vacuum chamber or space between the plies, and it especially pertains to liners of plastic film fabricated from a tubular film sheet that is doubled upon itself from one end to the other to bring the two opposite free ends in substantial alignment or registration at one end of the multiple ply structure thus formed opposite to the resulting folded end joining the two plies. The registered free ends of the plies are then heat sealed transversely to join them together to close the intervening space and form a vacuum chamber between the plies, and also to close one end of the double walled tubular form.

The tubular film sheet which is to be retroverted is preferably extruded into form to be without longitudinal seams, and accordingly the multiple plies of the wall of the retroverted structure are likewise seamless. The liner is seamless except for the transverse end seam. After the liner is filled, its opposite end may likewise be heat sealed for enclosing the contents within the liner. The multiple wall not only provides added protection but, with the ends of the plies sealed, a vacuum space or chamber is provided with a small amount of air trapped therein for insulating the wall. The trapped air also tends to hold the plies separated between the sealed ends and facilitates relative movement thereof to distribute any stress and strain to which the plies are subjected. Accordingly, rupture of either of the plies is materially lessened, thereby preserving the contents of the liner from contact with the drum.

Accordingly, one of the principal objects of the invention is a liner having a multiple wall with the ends of the plies sealed to provide a vacuum space or chamber between said plies.

Another object of the invention is a liner with a multiple wall to give added protection and distribute the stresses.

Another object of the invention is a liner with a multiple wall having a vacuum chamber enclosed by the plies and containing a small amount of air therein.

Another object of the invention is a plastic film liner which is simple in construction and efficient in operation.

Further objects, and objects relating to details of construction and economies of operation will readily appear from the detailed description to follow. In one instance, I have accomplished the objects of my invention by the device and means set forth in the following specification. My invention is clearly defined and pointed out in the appended claims. A structure constituting a preferred embodiment of my invention is illustrated in the accompanying drawing, forming a part of this specification, in which:

Figure 1:
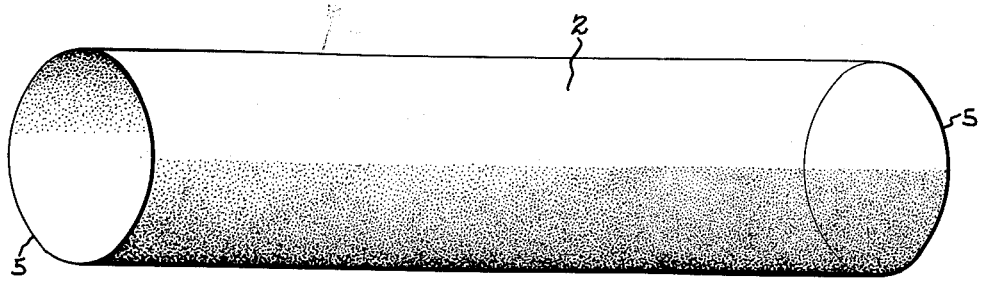
Fig. 1 is a side view of a tubular film sheet from which the liner is formed.
Figure 2:
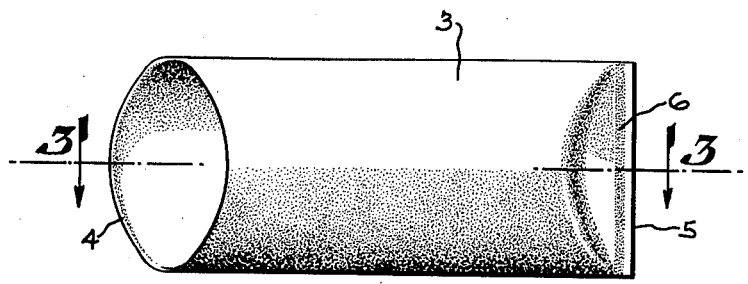
Fig. 2 is a view of a liner embodying the invention made from the tubular film sheet of Fig. 1.
Figure 3:
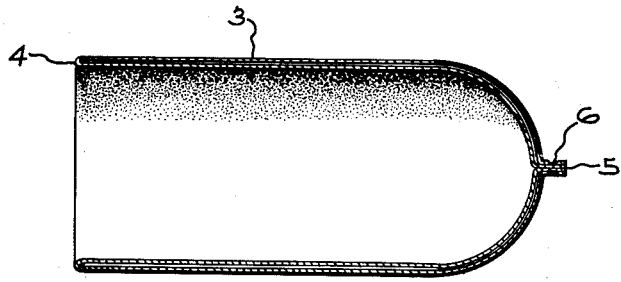
Fig. 3 is a cross section line 3—3 of Fig. 2.

Generally described, the invention comprises a single ply seamless tube of plastic film molded from thermoplastic materials composed of such plastic materials as polymerized ethylene derivative, vinyl resins and the like, particularly polyethylene, the tube being doubled back upon itself to form a double wall tube, one half of the length of the single wall tube. With the double wall thus formed, the wall plies are folded at one end to close the space therebetween. The free ends of the two plies, which are superimposed in registration in the double wall structure, are heat-sealed transversely to enclose the end of the space therebetween, and also to close one end of the double wall tube to form a liner that is closed at one end and open at the other. This is the form in which the liners are manufactured and sold for being filled. The open end of the filled liners may then be closed by being twisted or heat-sealed transversely by a seam similar to that for closing the other end of the tube for forming said liner.

The invention is not limited to any particular way of doubling the tubular sheet upon itself, but this can be readily done by placing the single wall tube upon a mandrel and simply pulling back one end toward the other.

Referring specifically to the drawings in which like numerals designate like parts, numeral 2 is a tube of plastic film of any desired length cut from a continuous tube as formed from an extrusion machine. The tube of plastic film may be formed of any suitable plastic materials such as cellulose acetate, vinyl resin and the like, polyethylene being especially suitable.

The single wall tube 2 is twice the length of the multiple wall liner 3 that is formed by retroverting or doubling tube 2 upon itself to form a fold 4 at one end and have its free ends 5 in registration or alignment at the opposite end, thereby forming a double wall tube that is one-half the length of the single wall tube before being retroverted. The folded end of the tubular sheet joins the plies and closes the space between them, with the opposite ends of the double wall tube left opened. The registered free ends 5 are heat-sealed transversely, by any suitable means, into a transverse seam 6, which seam also joins the opposite side portions of the tube to close the end thereof for forming the liner. With the free ends of the plies also sealed in superimposed relation, a vacuum chamber or space is formed between said plies and in which a small amount of air is contained, the intermediate portions of the plies, between the opposite sealed ends, being separable or in loosely superimposed relation.

The double ply wall not only gives added protection, but the sealed space or chamber between the plies, with some air trapped therein, provides a vacuum space or chamber for insulating the multiple wall. Furthermore, the small amount of air that is trapped between the plies tends to distribute any stress and strain and facilitates relative movement between the plies, thereby not only reducing the likelihood of tearing or rupturing of the plies but also preventing a tear or rupture being made in both plies of the wall. During handling and transportation of the drum there is considerable shifting of the weight of the material placed within the drums, and the double ply wall facilitates this by the relative movement between the plies to relieve undue stress or strain upon said plies.

While the tubular forms are preferably seamless by being extruded in tubular form, it will, of course, be understood that the tube could be formed from a flat sheet which is folded to have its opposite ends overlapped and joined by heat sealing. The invention is not limited to any particular method for forming the liner.

The liners are used in metal and fiber drums or containers for bulk packaging liquid, semi-liquid and solid materials. The filled liners may be removed from the drums or containers to be squeezed, much like a flexible tube, to discharge the contents. They are also useful as bags and may be generally referred to as such.

I am aware that there may be various changes in details of construction without departing from the spirit of my invention, and, therefore, I claim my invention broadly as indicated by the appended claims.

Having thus described my invention what I claim as new and useful and desire to secure by United States Letters Patent, is:

1. As an article of manufacture, a bag provided with a seamless tubular wall comprised of a plurality of plies formed from a seamless, flexible tube having one end retroverted in respect to its other end for juxtaposing said opposite ends to provide the plurality of plies, and a transverse single seam formed by lapping together the opposite free ends of the plies for closing one end of the bag.

2. As an article of manufacture, a bag provided with a seamless tubular wall comprised of a plurality of plies formed from a seamless, flexible tube folded upon itself to form said plurality of plies and have them joined at one end by a fold and at the opposite end by a transverse seam to form a vacuum chamber or space between the plies, and a joint seam, common to the transverse seam, connecting the opposite walls to close one end of the bag.

3. The bag of claim 2 in which the plies are made of thermoplastic film and the common transverse seam is formed by heat-sealing the plies.

4. The bag of claim 3 in which a small amount of air is contained within the chamber or space between the plies.

5. As an article of manufacture, a bag provided with a seamless tubular wall comprised of a plurality of plies formed from a flexible seamless tube doubled upon itself with its opposite free ends in registration opposte a folded end, and a common transverse seam joining the free ends of the tube and the opposite sides of the bag.

6. As an article of manufacture, a bag comprised of a flexible seamless tube which is doubled in telescopic relation upon itself to provide a multiple of plies folded at one end with the opposite free ends of the plies in the opposite wall portions lapped and secured together into a single seam to enclose the space between the plies and to close one end of the bag.

7. The method of making a multiple wall bag having one end opened and the opposite end closed comprising forming a flexible seamless tubular sheet, doubling back one-half of the tubular sheet to bring its opposite free ends in registration for forming a double ply wall with the space between the plies closed at one end, and fixing together the opposite wall portions adjacent the registering ends to close the space between the plies and to close one end of the double wall tube.

8. The method of claim 7 having the tubular sheet of heat sealable material and fixing together the opposite wall portions adjacent the registering ends and closing one end of the double wall tube by heat sealing.

9. The method of making a multiple wall bag, having one end open and the opposite end closed, comprising forming a seamless, plastic film tubular sheet, open at its opposite ends, doubling back one-half portion of said tube upon the other half portion, to bring its opposite free ends in registration for forming a double ply wall, and heat sealing all of the free ends together transversely into a single seam for closing the space between the plies and enclosing one end of the tube.

10. As an article of manufacture, a bag provided with a multiply wall comprised of a plurality of seamless tubular plies nested together and having the innermost and outermost plies joined at one end to close the space between them, said innermost and outermost plies being an one-half portion retroverted over the other half portion, and a transverse single seam at the opposite end formed by lapping and sealing together all of the plies for closing one end of the bag.

11. The bag of claim 10 in which the innermost and outermost plies are of polyethylene.

References Cited in the file of this patent

UNITED STATES PATENTS

| | | |
|---|---|---|
| 2,033,238 | Geyer et al. | Mar. 10, 1936 |
| 2,043,782 | Sprosty | June 9, 1936 |
| 2,282,258 | Snyder | May 5, 1942 |
| 2,301,128 | Landefeld | Nov. 3, 1942 |
| 2,344,369 | Salfisberg | Mar. 14, 1944 |
| 2,584,722 | London | Feb. 5, 1952 |